July 30, 1968 B. J. WARMAN 3,395,253

TELECOMMUNICATION COORDINATE RELAY SWITCHING SYSTEMS HAVING AUXILIARY HOLDING MEANS

Filed Aug. 17, 1965 2 Sheets-Sheet 1

United States Patent Office 3,395,253

Patented July 30, 1968

3,395,253

TELECOMMUNICATION COORDINATE RELAY SWITCHING SYSTEMS HAVING AUXILIARY HOLDING MEANS

Bloomfield James Warman, London, England, assignor to Associated Electrical Industries Limited, London, England, a British company Filed Aug. 17, 1965, Ser. No. 480,433
Claims priority, application Great Britain, Aug. 25, 1964, 34,709/64; Dec. 10, 1964, 50,336/64
4 Claims. (Cl. 179—18)

This invention relates to automatic telecommunication switching systems and in particular to co-ordinate, or cross-point, switching systems employing relays.

As is known, a relay cross-point switching system employs "switches" each made up of a co-ordinate array of relay contact sets of which there is one such contact set at each cross-point between a plurality of vertical multiples and a plurality of horizontal multiples, each such multiple comprising a number of conductors according to the number of physical connections required to be established through the array in respect of a single communication path set up through it. For instance in a telephone exchange each multiple may comprise two conductors corresponding to the two speaking wires of a subscriber's line, together with other conductors affording control connections required for instance for line testing and holding purposes. Usually each contact set is controlled by an individual relay and will be so assumed herein, but the possibility is not excluded of the contacts of a set being controlled by two or more relays acting equivalently to a single relay. The terms horizontal and vertical in the context of co-ordinate switching are used only as a convenient mode of identifying the respective co-ordinate multiples; these multiples are not necessarily disposed horizontally and vertically in a practical layout.

In a co-ordinate switching system the switching arrays are usually arranged in a switching network comprising a number of switching stages each of which itself comprises a number of such arrays each affording access to some or all of the arrays in an adjacent stage. Adjacent stages are interconnected by multi-conductor paths, herein called links, which extend between the horizontal or vertical multiples of the switching arrays of one stage and the horizontal or vertical multiples of the switching arrays of the next stage. By selective operation of the relays a communication path can be established, over the switching stages and the links between them, between multi-conductor terminal connections which are connected to horizontal or vertical multiples of the switching arrays in the first and last, respectively, of the switching stages concerned. These connections may on the one hand extend, for instance, towards subscribers' lines and on the other hand may extend towards other exchange equipment such as registers or supervisory circuits or to external links extending back into the switching network. The establishment of such communication path between any two such terminal connections is controlled by a control circuit which acts in dependence on the particular terminal connections involved and on which links within the network are available and suitable for establishing the communication path.

In the specification of our Patent No. 3,129,293 there is described and claimed a novel arrangement for operating and holding the cross-point relays in a switching system as just outlined. In that arrangement, the relay for each cross-point has an operating winding and a make contact connected in series with each other between control conductors included in the multiples defining the cross-point, whereby in respect of any communication path through the stages there can be established, by way of said control conductors and corresponding control conductors in the links between the stages, a control connection including the series-connected operating winding and make contact of a relay in each stage, the winding of such relay being in each case electrically nearer a particular end of the control connection than is the contact; a marking connection including a unidirectionally conductive device is taken to the junction between the winding of each relay and its make contact in series with it. To establish such communication path, and with it the appertaining control connection, an operating potential is applied to said particular end of the control connection and the marking connections for the relays involved are marked in turn, in sequence from said end, with a potential of such polarity with respect to the operating potential that the unidirectionally conductive devices in the marked marking connections will permit a resultant flow of operating current from the relays. After establishment of the communication path, that is, after operation of the last relay in said sequence, a holding connection for the operated relays can be completed between on the one hand a holding potential connected at the other end of the control connection and having a polarity which is opposite to that of the operating potential with respect to the marking potential, and on the other hand a potential approximating to the marking potential and connected at the same end of the control connection as was the operating potential, thereby allowing the operating and marking potentials to be removed—for example on release of the control circuit to serve another call—without release of the relays. The establishment of the holding connection which results in the flow of holding current through the serially connected operated relays in the established control connection, may be controlled at either end of the control connections; that is, either the holding potential may be permanently connected and the aforesaid potential approximating to the marking potential switched in at a suitable time after the operation of the last relay in the sequence, or this latter potential may be permanently connected and the holding potential switched in at a suitable time: in either case the switching means controlling the establishment of the holding connection may also be used for interrupting it to release the relays on clear-down of the communication path.

Inasmuch as the make contacts connected in series with the operating windings of the cross-point relays serve to extend the control connection progressively from stage to stage as the marking proceeds and eventually form part of the holding connection established over the control connection, they will be hereinafter referred to as extending and holding contacts.

It is a feature of the mode of connection and operation forming the subject of our said patent that after one communication path has been established through the switching stages it is possible to establish therethrough a second such path (hereinafter termed a partially overlying communication path) which involves in at least one of the stages (but not in all of them and not in an intermediate stage alone) the same cross-point as does the first path; the relays at the remaining cross-points in the first path are alone released, leaving only the second path established. As will be explained later, this partial release of the first path takes place automatically as the cross-points for the second path are sequentially marked through. This can be an important asset when the first path has by this time served its function and would otherwise have to be released in some other manner. However, there are circumstances in which it may be desirable to maintain the first path at least for a short interval of time after establishment of the second path. This arises for instance if the first path is included in a connection to a register which is required to remain coupled until another connection including the second path and extending for example to a line whose identity is stored by the register, has been established and verified. Another circumstance in which ability to hold the first of two partially overlying communication paths may be desirable is when the facility is required of returning to the first path after the second path has been utilised.

In accordance with the present invention such holding of a first communication path extending through the switching network is rendered possible by the provision of an auxiliary holding connection extending to such point in each control connection (being a point between the operating winding of a cross-point relay in one stage and the operating winding of a cross-point relay in the next stage in the direction of marking) as corresponds to a possible branch point between such first communication path and a partially overlying second communication path; the auxiliary holding connection includes a unidirectionally conductive device poled in the same sense relatively to the control connection as are the unidirectionally conductive devices in the marking connections, and means is also provided for applying to this auxiliary holding connection, at least at such time as the first communication path is otherwise liable to be broken during the marking procedure for the partially overlying path, an auxiliary holding potential which is commensurate with that normally existing at the point of connection of the auxiliary holding connection by virtue of the holding connection established for the first path but which nevertheless differs therefrom to such extent and in such sense as to back-off the unidirectionally conductive device in the auxiliary holding connection when these two potentials are present together.

Figure 1:
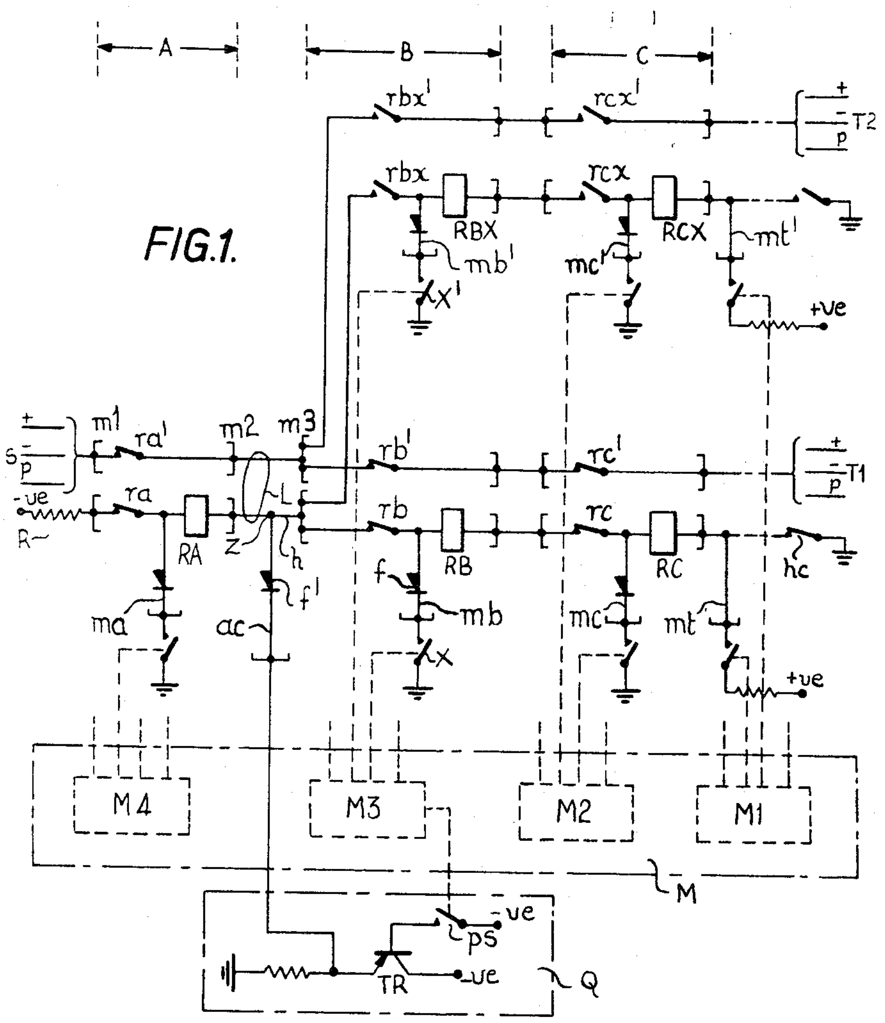
FIG. 1 illustrates in abbreviated form a relay cross-point switching network and control arrangement embodying the invention.

Referring to FIG. 1, this embodiment concerns a co-ordinate relay switching system having a switching network comprising three co-ordinate switching stages A, B and C from which there has been illustrated only the relays and contacts for typical cross-points involved in two overlying communication paths. These paths can be established between a multi-conductor terminal connection S at one side of the network and one and the other, respectively of two terminal connections T1 and T2 at the other side. The connection S may extend to a subscribers line; the connections T1 and T2 may lead to other lines or to ancillary equipment of the switching system, doing so either directly or back through the switching stages via other communication paths established therethrough: in particular, if the terminal connection S extends to a calling subscriber's line, connection T1 may lead to a register and connection T2 towards the called subscriber's line. The path S–T1 is shown as having already been established: the invention is concerned with the situation which arises if it is desired to establish the path S–T2 while temporarily maintaining the path S–T1.

At the cross-points included in the path S–T1 in stages A, B and C are respective relays (for example so-called reed relays) having operating windings such as RA, RB, RC, together with extending and holding contacts such as *ra, rb, rc,* and switching contacts typified by *ra', rb', rc'*. The extending and holding contacts are normally open ("Make") contacts, as are also the switching contacts. Assuming it is a telephone switching system, the switching contacts typified by *ra', rb', rc'*, serve, when closed, to connect-through the usual speaking and test wires marked +, — and *p*. The horizontal and vertical multiples between which the cross-points are defined in the co-ordinate switching assembly of each stage are represented conventionally by the rectangular brackets such as *m*1 and *m*2 for stage A.

Multi-conductor links such as L interconnect the several stages between respective multiples therein. Each multiple and each link includes in addition to conductors corresponding to the speaking and test wires, a control conductor such as *h*. The operating winding (e.g. RA) of each cross-point relay is connected in series with its extending and holding contact (e.g. *ra*) between the control conductors *h* in the multiples defining the cross-point. Consequently with cross-point relays RA, RB and RC operated to establish connection between S and T1 over the contacts typified by *ra', rb', rc'*, there is also established a control connection which can be traced through relay winding RC, contact *rc*, relay winding RB, contact *rb*, relay winding RA and contact *ra*. The relays concerned are held operated in this control connection between a negative potential applied through a limiting resistor R at one end and earth potential applied at the other end through a contact *hc* which is closed after the control connection has been established.

Establishment of such control connection and with it of the communication path S–T1 is effected under the control of a marker M having individual marking sections M1 . . . M4 which control the sequential application of marking potentials to marking leads *mt* connected to the last-mentioned end of the control connection and *mc, mb* and *ma* connected respectively to the junctions between the relay windings RC, RB, RA and their contacts *rc, rb, ra*. The markings are applied by suitable switches such as X which for simplicity are shown as contacts; in practice these switches may be relay contacts (for instance contacts of reed relays) or they may be electronic switches. The particular leads which are marked are selected in accordance with the particular cross-point relays which have to be operated to establish a particular communication path through the switching network; the manner in which this selection is made and in which the marker operates are of no concern as regards the present invention and can be based on known techniques of marker controlled switching.

With the relays RA, RB and RC initially unoperated and with the rectifiers such as *f* connected in the sense shown, the marker sections M1 and M2 mark lead *mt* with a positive potential and lead *mc* with earth potential, resulting in energisation of relay winding RC and closure of contacts *rc* and *rc'*. An earth marking is now applied to lead *mb* by the marker section M3 and the marking on lead *mc* is removed, resulting via contacts *rc* in the energisation of relay winding RB in series with winding RC: consequently contacts *rb* and *rb'* are operated and contacts *rc, rc'* remain operated. The marking lead *ma* is now marked by section M4 and the marking of lead *mb* is removed, so that winding RA is now energised in series with windings RB and RC and contacts *rb* and *rc*. Contacts *ra* and *ra'* are thereby also operated, completing the communication path between S and T1 and extending through resistance R to the negative holding potential the control connection now established through contacts *ra, rb, rc* and the relay windings. The relays are therefore held operated between this negative holding potential and the positive potential still applied to the marking lead *mt* at the other end of the control connection. Subsequently an external circuit (not shown) operates a contact *hc* to apply a holding earth potential to this latter end of the control connection, thereby rendering the marking on lead *mt* dispensible and enabling the marker M to be released. The communication path between S and T1 has now been established with the various contacts in the condition shown in FIG. 1. A more detailed description of the overall organization and mode of operation will be found in our Patent No. 917,017 previously referred to.

Turning now to the communication path between S and T2, it will be noted that this path involves in stage A the same cross-point (namely that to which relay RA relates)

as does the path S and T1. However the path between S and T2 which branches from that between S and T1 at the multiple to which link L is connected at stage B, involves in stages B and C the cross-points to which relays RBX and RCX relate. Consequently to establish the path S–T2 the marker sections M1–M4 would mark sequentially the marking leads *mt', mc', mb' and ma.* On reaching the stage on the marking procedure at which lead *mb'* has been marked, relays RCX and RBX have been operated to close their contacts *rcx, rcx'* and *rbx, rbx'*. Because of the already operated condition of relay RA, this completes the communication path between S and T2 and the corresponding control connection through relay windings RA, RBX and RCX. The subsequent marking of lead *ma* therefore has no effect. However, after the closure of contacts *rbx* and before the removal of the earth marking applied to lead *mb'*, this marking has the effect through contacts *rbx* of short-circuiting the holding connection through relay windings RB and RC and contact *hc*. Normally therefore these relays would be released, breaking the communication path between S and T1.

To prevent this, in circumstances such as those outlined earlier, an auxiliary holding connection *ac* including rectifier *f'* is connected to the control connection at the point (Z) corresponding to that at which the communication path between S and T2 branches from that between S and T1; thus in FIG. 1 the auxiliary holding connection is shown connected to the control wire *h* in the link L between stages A and B. Other auxiliary holding connections (not shown) are similarly connected for the same purpose to the *h* wires in the other links between the A and B stages. Likewise if the possibility exists of partially overlying communication paths which involve the same cross-points in stages A and B (but different cross-points in stage C) similar auxiliary holding connections can be connected to the links between stages B and C.

It will be appreciated that with the relays RA, RB and RC operated and held in the control connection established through their contacts *ra, rb'*, and *rc*, the potential of the point Z will be determined by the potential dividing effect of the relay windings and the resistor R. However in the absence of any potential on the auxiliary holding connection *ac* the marking of lead *mb'* would be effective through contacts *rbx* to change the potential of point Z to the (earth) marking potential.

Under control of the marking sections M3 the marking of a B stage marking lead such as *mb* or *mb'* is accompanied by the marking of the appropriate holding connection such as *ac* with an auxiliary holding potential which is somewhat less negative than that present at the point Z when a control connection including it has been established.

The marking of lead *mb'* during the setting-up of the path between S and T2 is therefore accompanied by the marking of the auxiliary holding connection *ac* and this clamps the potential of point Z to the negative auxiliary holding potential. Consequently relays RB and RC remain operated. The application of the auxiliary holding potential at the same time to the auxiliary holding connection connected to any other control connection already established through the switching stages has no effect because the rectifier corresponding to *f'* in that auxiliary holding connection remains backed-off due to the relatively negative potential of its connection point corresponding to Z.

Figure 1A:
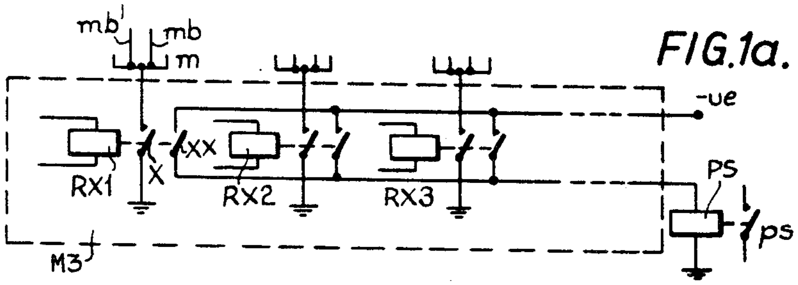
FIG. 1A illustrates how the marker equipment may effect the application of the auxiliary holding potential.

By way of example, the auxiliary holding potential may be applied by means of a circuit Q comprising a transistor TR connected to an emitter-follower having the auxiliary holding connections *ac* connected to its emitter and including in its base circuit a pulsing switch *ps* operable under control of the marking section M3 (for example in the manner illustrated in FIG. 1A) to bring the transistor base, and hence its emitter, to the potential required for the auxiliary holding potential. (A typical potential would be —24 volts for a holding potential at resistor R of —50 volts.) The transistor TR in this way can provide a stabilised auxiliary holding potential.

The auxiliary holding potential may alternatively be continuously applied or may be applied only when a communication path in process of being set-up by the marker is in fact a path which partially overlies an already established path.

Instead of the cross-point contacts such as *ra* and *ra'* being controlled by one and the same operating winding such as RA, they may be controlled by separate operating windings connected in the control connections in the manner described in our application Ser. No. 172,681, now Patent No. 3,229,039.

The cross-points which in any particular switching stage are associated with the same "ordinate" in the co-ordinate switching arrays can in suitable circumstances be marked in that ordinate by a single marking switch relating to that ordinate. Thus as will be apparent from FIG. 1, the cross-point relays RB and RBX relate to respective cross-points each of which is defined by two co-ordinate multiples one of which is common to both, namely the multiple represented at *m3* connected via the inter-stage link L to the A stage. Consequently separate switches such as X and X' for marking the cross-points associated with such common multiple are not necessary because this marking can be effected by means of one and the same marking switch to which the marking leads such as *mb* and *mb'* are connected in common; that is by connecting in common to the switch such as X, the marking leads *mb* and *mb'* and all the other marking leads relating to the same ordinate, this marking switch X can control the marking of all these leads. Thus in FIG. 1A the marker section M3 is shown including a marking relay RX1 the contact X of which when operated, applies the required earth potential marking to the leads *mb* and *mb'* and to corresponding marking leads connected in common to it as represented by the rectangular bracket *m.* Likewise for marking the cross-points associated with other ordinates in stage B the marking section M3 in the form illustrated by this figure includes additional marking relays RX2, RX3. Each of the marking relays is shown as having an additional contact such as XX and these contacts are connected in a parallel network in series with a relay PS which controls a contact *ps* corresponding to that included in the circuit Q in FIG. 1. Thus whenver the marker section M3 operates one of its marking relay the contact of that relay in series with relay PS will bring about operation of this latter relay, thereby operating its contact *ps* to apply the auxiliary holding potential in the manner and for the purpose previously described.

In the embodiment of FIG. 1 the branch point such as Z to which each auxiliary connection such as *ac* is made lies between the extending and holding contact *rb* of a cross-point relay in one stage B and the operating winding RA of a cross-point relay in the next stage A in the direction of marking. However it is not necessary for the auxiliary connection to be taken directly to a branch point in question, provided that the applied auxiliary potential will be effective at that point. Thus the auxiliary holding connection can as previously stated extend to any point in the control connection between the operating windings of respective cross-point relays in successive stages. This is possible because at such time as the auxiliary potential has to be effective, the extending and holding contact between two such operating windings will be closed, permitting the auxiliary potential to be extended to the branch point. In particular it is contemplated that as an alternative to the FIG. 1 arrangement, the auxiliary connection may be taken to a point between the operating winding of a cross-point relay and the extending and holding contact of this same relay through the unidirectionally conductive device in the marking connection to that point, the auxiliary connection still including its own unidirectionally conductive device.

Figure 2:
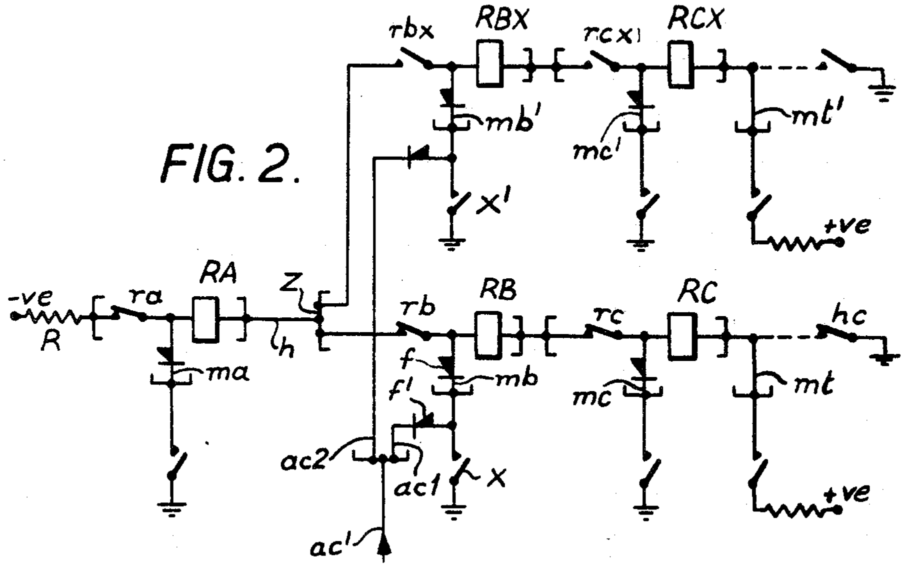
FIGS. 2 and 3 illustrate possible modifications of the embodiment illustrated by FIG. 1.

This latter arrangement is illustrated in FIG. 2 of the accompanying drawings, in which only the control connections for two partially overlying communication paths are shown, one of them (through RB and RC) being shown in its established condition. The various components and leads have been given the same reference characters as the corresponding parts in FIG. 1 and it will be seen that the overall arrangament is generally the same as before so that a detailed description is not necessary. In this case however, instead of an auxiliary holding connection taken directly to the branch point Z, corresponding auxiliary connections such as *ac*1 and *ac*2, each with its own rectifier such as *f′*, are taken to the B stage marking connections such as *mb* and *mb′* at points therein between the marking switches as X, X′ and the rectifiers such as *f*. It will be noted that these points are on the common side of the marking multiples so that each auxiliary connection serves a corresponding group of cross-points. If, as previously described and as assumed for FIG. 1A, corresponding marking leads such as *mb* and *mb′* are marked in common through a single switch such as X, a single auxiliary connection such as *ac*1 alone would serve for all the cross-points to which these commoned marking leads extend. When a first communication path has been established the corresponding control connection through the operating windings of the cross-point relays RA, RB and RC is held through ther espective contacts *ra, rb, rc* of these relays as shown. Consequently when in setting up a partially overlying path involving cross-point relays RBX and RCX the marking of connection *mb′* to operate relay RBX would tend to release relays RB and RC by short circuit through contact *rbx* when it closes. However the temporary application of the auxiliary holding potential to lead *ac′* is effective via connection *ac*1, through rectifiers *f′* and *f* and relay contacts *rb* (closed), to clamp the potential of point Z and thereby prevent the releast of relays RB and RC.

It is possible, by reversing the relative polarities of the various potentials applied to a control connection in setting it up and subsequently in holding it, to substitute earth potential in place of the negative potential which is required in the arrangement of FIG. 1 at the line connection end S of the control connections. This substitution has the advantage that the battery protecting resistor R, which is required at the line connection end of the control connection when negative battery is connected to that end will now be required at the other end, so that various problems which may arise when it is at the line connection end can be avoided. With the relative polarities thus reversed (requiring the unidirectionally conductive devices to be reversed also), the auxiliary holding potential has to be appropriately modified in magnitude to take account of the fact that the potential dividing action of the series-connected elements in an established control connection now creates a different potential at the branch points such as Z.

Figure 3:
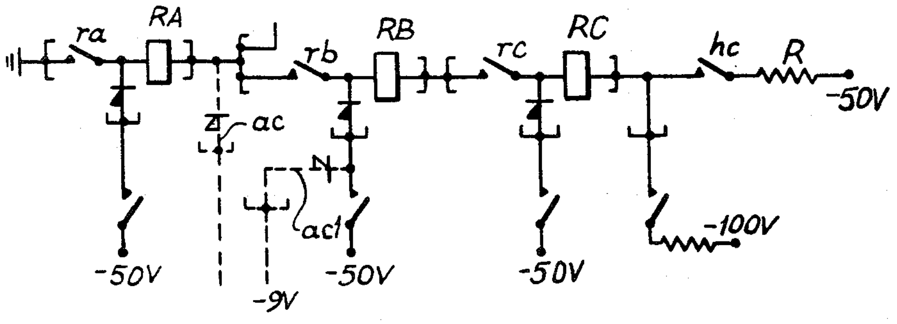

The modified arrangement is shown in FIG. 3 for a single control connection with the two alternative positions for the auxiliary holding connections shown in dotted lines. Typical potential values are given by way of example, it being noted that the auxiliary marking potential (indicated as −9 volts but able to differ from that say between −8 and −10 volts) is now significantly less than the value (e.g. −24 volts) required for the previous arrangements.

What I claim is:

1. A co-ordinate relay switching system comprising a multi-stage co-ordinate switching network including for each communication path establishable therethrough a control connection which includes for each cross-point included in said path an operating winding of a relay for that cross-point and an extending and holding make contact of the relay connected in series with said operating winding on the opposite side thereof from a particular end of the control connection, the system further comprising means for applying an operating potential to said particular end of each such control connection, marking connections which include respective unidirectionally conductive devices and are respectively connected to the junctions between the said cross-point relay operating windings and their said make contacts in said control connections means for applying to selected marking connections a marking potential of such polarity in relation to the operating potential as to be effective, through the unidirectionally conductive devices in the selected marking connections, to operate the cross-point relays in a particular control connection successively from said particular end thereof, auxiliary holding connections extending to such points in the control connections as correspond to possible branch points between two partially overlying communication paths and including unidirectionally conductive devices poled in the same sense relatively to the control connections as are the unidirectionally conductive devices in the marking connections, and means for applying to each auxiliary connection, at least during the establishment of a partially overlying communication path branching from an already established path at the branch point to which such auxiliary connection relates, an auxiliary holding potential commensurate with the potential existing at the corresponding point in the control connection established for the first path but differing therefrom to such an extent and in such sense as to back-off the unidirectionally conductive device in the auxiliary connection when these two potentials are present together.

2. A switching system as claimed in claim 1 including means for applying the auxiliary holding potential only temporarily to an auxiliary holding connection at such time as the marking of a selected marking connection during the establishment of a partially overlying communication path is liable to cause release of an already established path branching therefrom at the point to which that auxiliary connection relates.

3. A switching system as claimed in claim 1 wherein the auxiliary holding connections are connected to the control connections at points therein lying between the included extending and holding contact of a cross-point relay in one stage and the operating winding of a cross-point relay in the next stage in the direction of successive operation of the relays in such control connection.

4. A switching system as claimed in claim 1 wherein the auxiliary holding connections with their included unidirectionally conductive devices are connected to points in the control connections between the operating winding of a cross-point relay and the extending and holding contact of the same relay, being connected thereto through the unidirectionally conductive devices in the marking connections connected to these points.

References Cited

UNITED STATES PATENTS 3,308,244 3/1967 Bruglemans.

KATHLEEN H. CLAFFY, *Primary Examiner.*

LAURENCE A. WRIGHT, *Assistant Examiner.*